United States Patent [19]

Kashida et al.

[11] Patent Number: 5,308,567
[45] Date of Patent: May 3, 1994

[54] METHOD FOR THE PREPARATION OF A RESIN MEMBRANE

[75] Inventors: Meguru Kashida; Yoshihiro Kubota; Yoshihiko Nagata; Hitoshi Noguchi, all of Gunma, Japan

[73] Assignee: Shin-Etsu Chemical Co., Ltd., Tokyo, Japan

[21] Appl. No.: 908,452

[22] Filed: Jul. 6, 1992

[30] Foreign Application Priority Data

Jul. 12, 1991 [JP] Japan .................... 3-198478

[51] Int. Cl.⁵ .................................. B29D 7/01
[52] U.S. Cl. ............................ 264/127; 264/216
[58] Field of Search ............. 264/205, 207, 216, 127

[56] References Cited

U.S. PATENT DOCUMENTS

| 1,824,337 | 9/1931 | Eichengruen . | |
| 2,710,426 | 6/1955 | Pratzer et al. | 264/216 |
| 2,783,894 | 3/1957 | Lovell et al. | 264/216 |
| 3,244,789 | 4/1966 | Hofmeier | 264/216 |
| 3,432,585 | 3/1969 | Watson | 264/216 |
| 3,524,753 | 8/1970 | Sharp | 264/216 |
| 4,895,769 | 1/1990 | Land et al. | 264/1.3 |
| 4,927,909 | 5/1990 | Wadhwa | 264/216 |

FOREIGN PATENT DOCUMENTS

| 396398 | 8/1933 | United Kingdom . | |
| 850885 | 10/1960 | United Kingdom | 264/216 |

Primary Examiner—James Lowe
Attorney, Agent, or Firm—McAulay Fisher Nissen Goldberg & Kiel

[57] ABSTRACT

A method is proposed for the preparation of a resin membrane suitable for use, for example, as a covering pellicle of a photolithographic mask for patterning of semiconductor devices in the electronic industry. The method comprises the steps of: (a) coating a continuous-length substrate with a solution of the resin by using a roller coater to form a coating layer of the resin solution; (b) drying the coating layer by evaporating the solvent to form a dry resin film on the substrate surface; and (c) peeling the resin film from the surface of the substrate, preferably, in water.

8 Claims, 1 Drawing Sheet

FIGURE
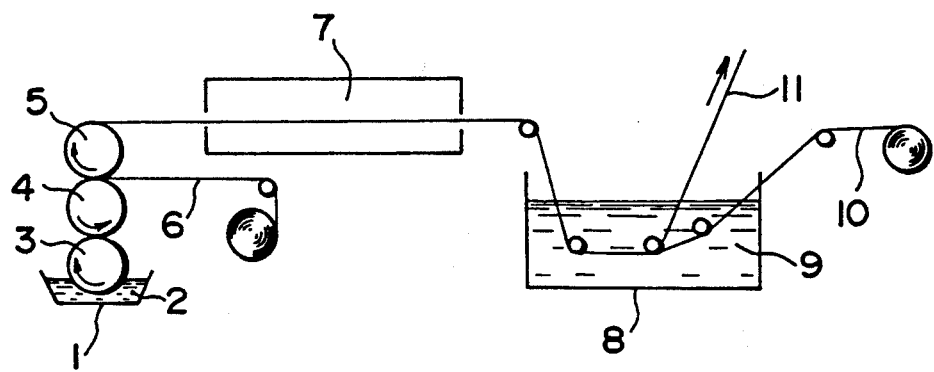

METHOD FOR THE PREPARATION OF A RESIN MEMBRANE

BACKGROUND OF THE INVENTION

The present invention relates to a method for the preparation of a resin membrane or, more particularly, to an efficient method for the preparation of a resin membrane useful as a pellicle covering a photolithographic mask in patterning of semiconductor devices, membrane for the separation of various kinds of gases, window material of optical instruments and the like having good uniformity in thickness.

Resin membranes used in the above mentioned applications or, in particular, those used as a pellicle in the manufacturing process of semiconductor devices usually have a thickness of 0.1 to 100 μm and are conventionally prepared by the method including the steps of coating the surface of a substrate with a solution of the resin by using a spinner or spin coater to form a coating layer, drying the coating layer by evaporating the solvent to form a dry resin film on the substrate surface and peeling the resin film from the substrate surface.

The above mentioned coating method by using a spinner, however, has several problems and disadvantages. For example, the productivity of the method is necessarily low because the substrates must be coated one by one each time by mounting a single substrate on the spinner. In the method, namely, the substrate is rotated at a high speed and the resin solution is put before the start of or during rotation of the substrate so that the resin solution is spread over the surface of the substrate by the centrifugal force forming a thin layer of the resin solution having a uniform thickness on the substrate surface. Therefore, the method has a limitation on the size of the film to be obtained which is usually 200 mm to 300 mm or smaller in diameter in order to ensure good uniformity in the thickness of the membrane.

SUMMARY OF THE INVENTION

The present invention accordingly has an object to provide a novel method for the preparation of a resin membrane free from the above mentioned limitation in the prior art method by using a spinner for coating with a resin solution.

Thus, the method of the present invention for the preparation of a resin membrane useful as a pellicle for photolithographic mask comprises the successive steps of:

(a) coating the surface of a substrate with a solution of a resin having film-formability in a solvent by using a roller coater to form a layer of the resin solution;
(b) evaporating the solvent from the coating layer of the resin solution to form a dry film of the resin on the substrate surface; and
(c) peeling the resin film from the substrate surface, preferably, in water.

BRIEF DESCRIPTION OF THE DRAWING

The FIGURE schematically illustrates the process diagram to practice the inventive method.

DETAILED DESCRIPTION OF THE PREFERRED EMBODIMENTS

The inventive method comprising the above described three steps has been completed as a result of the inventors' extensive investigations undertaken with an object to develop a novel method for the preparation of a resin membrane free from the limitation in the prior art method relative to the size of the membrane and low productivity arriving at a discovery that a continuous-length resin membrane having a width of 1 meter or even larger can be prepared continuously and with high productivity by the method comprising these three steps. Namely, the most essential feature in the inventive method consists in the use of a roller coater in step (a) for coating the substrate surface with a resin solution.

The method of the present invention is most advantageously applied to the preparation of a resin membrane used as a pellicle for dust-proofing of a photolithographic mask in the fine-patterning work of a semiconductor material in the electronic industry although the applicability of the inventive method is not limited thereto but includes preparation of resin membranes used for gas separation, as a material of windows in optical instruments and so on.

The resin as the base material of the resin membrane prepared by the inventive method is not particularly limitative but, when the intended application of the membrane is as a pellicle, most advantageously selected from the group consisting of copolymers of tetrafluoroethylene and a fluorine-containing ethylenically unsaturated monomer having a cyclic perfluoro ether group, tert-butyldimethylsilyl-modified polyvinyl alcohols obtained by the reaction of N,O-bis(tert-butyldimethylsilyl) trifluoroacetamide with a polyvinyl alcohol, semi-synthetic cellulose based resins such as nitrocellulose, cellulose acetate, ethyl cellulose and the like, silicon-containing polymers such as poly(vinyl trimethyl silane) and the like, pullulan compounds and so on.

The step (a) of the inventive method is, of course, preceded by a step for the preparation of the resin solution by dissolving the above mentioned resin in a suitable solvent which depends on the types of the resin. The concentration of the resin in the resin solution, which is usually in the range from 5 to 10% by weight, naturally depends on various factors including properties of the resin per se, desired thickness of the resin membrane, viscosity of the resin solution appropriate for the particular roller coater and so on. The solvent, which of course must be capable of dissolving the resin, should preferably have a boiling point in the range from 50° to 150° C. When the boiling point of the solvent is outside of this range, the product of the resin membrane would have decreased smoothness of the surface in addition to the inconvenience caused in the coating and drying steps.

The step (a) of the inventive method is for coating of the surface of a substrate with the resin solution. The substrate is in the form of a film or sheet, preferably, of a continuous length and should have a surface as smooth as possible. Suitable substrates include films of a plastic resin such as polyethylene, polypropylene, polystyrene, polyester, fluorocarbon resin and the like, paper sheet laminated with a polyethylene film, foils of a metal such as aluminum, and so on. It is preferable that, prior to step (a), the substrate surface is coated or treated with a silicone-based or fluorocarbon resin-based surface-release agent in order to enhance the productivity in step (c).

The roller coater used in step (a) of the inventive method is not limited to a machine of a particular type but can be any of conventional blade coaters, rod coaters, air-doctor coaters, knife coaters, gravure coaters, transfer coaters and the like. Offset gravure coaters are particularly preferable in respect of the uniformity in the thickness of the coating layer even when the thickness of the membrane desired is very small to be 1 μm or smaller. The thickness of the coating layer or the coating amount with the resin solution naturally depends on the desired thickness of the resin membrane but it is usually in such a range that the dry resin film formed in step (b) by drying the coating layer may have a thickness in the range from 1 to 10 μm depending on the particular application of the resin membrane. When the resin membrane is to be used as a dust-proof pellicle for photolithographic mask, the thickness should be in the range from 0.5 to 8 μm while a resin membrane for gas separation should have a thickness of 50 to 100 μm and a resin membrane as a material of windows in optical instruments should have a thickness of 5 to 10 μm.

Step (b) of the inventive method is for drying of the coating layer of the resin solution on the substrate surface by evaporating the solvent therefrom. Though not limitative, efficiency of drying can be increased by passing the substrate sheet bearing the coating layer through a hot-air drying oven heated at a temperature of the boiling point of the solvent or somewhat higher so that a dry resin film on the substrate surface can be obtained with high productivity.

Step (c) of the inventive method is for peeling of the dry resin film formed on the substrate surface in order to give an unsupported resin membrane. Easiness of this peeling step largely depends on the combination of the resin and the material of the substrate as well as the surface-release treatment of the substrate surface. Peeling of the resin film from the substrate surface can be facilitated by conducting the procedure by dipping the film-bearing substrate in water. It is not always required that this step is carried out continuously but the substrate sheet bearing the resin film thereon is cut into cut sheets of an appropriate length and the resin film is peeled off from one of the cut sheets of the substrate one by one, preferably, in water. It is also a possible way of peeling that a frame to support the membrane after peeling thereof from the substrate is adhesively bonded to the resin film still on the substrate surface prior to peeling so that the resin membrane obtained by peeling of the resin film is already supported by a frame. Unless this way is undertaken, the resin membrane obtained by peeling of the resin film from the substrate is then adhesively bonded to a film or covered with another resin film for temporary protection.

Following is a brief description of the apparatus used for practicing the method of the present invention with reference to the Figure of the accompanying drawing, which is a schematic flow diagram of the apparatus and the process. The resin solution 2 held in the tank 1 is applied to the polyester film 6 as the substrate by means of the gravure roller 3, rubber roller 4 and back-up roller 5. The substrate film 6 coated with the resin solution 2 is continuously transferred into the drying oven 7 where the solvent is evaporated from the coating layer on the substrate 6 to form a dry resin film of an appropriate thickness. The substrate 6 bearing the resin film is then led into water 9 held in a water tank 8 where the resin film is peeled from the substrate 6 into an unsupported membrane 11 while the substrate film 10 freed from the resin film is recovered and recycled.

As is understood from the above given description, the inventive method comprising the three steps provides a highly productive means for the preparation of a resin membrane useful as a pelicle for photolithographic mask having high uniformity in the thickness without limitation in the size or width.

In the following, the method of the invention is described in more detail by way of examples and comparative examples.

EXAMPLE 1

A resin solution of 10% by weight concentration was prepared by dissolving TEFLON ® AF 1600, which was a copolymer of tetrafluoroethylene and a fluorine-containing monomeric compound having a cyclic perfluoroether group in the molecule as manufactured and supplied by Du Pont Co., in a fluorine-containing solvent FLUORINERT ® FC-75 (a product by Minnesota Mining & Manufacturing Co.) having a boiling point at 102° C. containing perfluoro(2-butyl tetrahydrofuran) as the principal ingredient.

In the next place, the tank 1 for the coating solution in the Figure was filled with this resin solution 2 which was applied continuously to a polyester film 6 of 38 μm thickness as the substrate at a coating velocity of 1 meter/minute using a roller coater consisting of an offset gravure roller 3 having a diameter of 10 cm and a width of 50 cm and provided on the surface with lattice-like cells of 200 mesh fineness, a nitrile rubber roller 4 having a diameter of 10 cm and a width of 50 cm and a stainless steel backup roller 5 having a diameter of 10 cm and a width of 50 cm. The substrate film 6 thus coated with the resin solution was continuously introduced into a 5 meter-long drying oven 7 heated with an infrared heater by which the temperature of the oven was kept at 50° C. at the inlet and at 120° C. at the outlet gradually increasing along the longitudinal direction of the oven so that the coating layer coming out of the outlet was completely dried. The substrate film bearing the resin film formed thereon was continuously introduced into the water bath in the water tank 8 in which the resin film 11 was peeled off from the substrate film 10 to give an unsupported resin membrane while the substrate film was wound up to be reused.

The resin membrane thus obtained was cut into cut films of an appropriate size and they were each adhesively bonded to a 5 mm thick aluminum frame of 150 mm by 150 mm outside dimensions and 90 mm by 90 mm inside dimensions by using an epoxy adhesive to give a frame-supported resin membrane suitable as a pellicle to cover a mask blank for photolithography. The appearance of this frame-supported resin membrane was perfect absolutely without pinholes, creases, stained spots and other defects.

One of the frame-supported resin membranes was subjected to the measurement of thickness at five spots including the center of the 90 mm by 90 mm wide membrane and four spots each near to one of the corners 10 mm apart from each side of the square by the interferometric method to calculate the thickness using the following equation:

$$d = \lambda_1 \lambda_2 N / 2n(\lambda_2 - \lambda_1),$$

in which d is the thickness of the membrane in nm, n is the refractive index of the resin forming the membrane which is 1.29 in this case, N is the number of the interference fringes, $\lambda_1$ is the wavelength in nm at about 450 nm and $\lambda_2$ is the wavelength in nm at about 650 nm. The values of the thickness were 0.98 μm at the center spot and 0.99 μm, 0.99 μm, 0.98 μm and 0.99 μm at the four spots near the corners.

The transmission of light through the resin membrane was 97.0% at the wavelength of 365 nm. These results support the conclusion that this resin membrane is excellent as a pellicle for photolithographic mask.

EXAMPLE 2

A polyvinyl alcohol was reacted with O-bis(tert-butyl dimethyl silyl) trifluoroacetamide and the thus obtained (tert-butyl dimethyl silyl)-modified polyvinyl alcohol was dissolved in toluene to prepared a resin solution in a concentration of 15% by weight. A resin membrane was prepared from this resin solution in substantially the same manner as in Example 1. This resin membrane was absolutely free from pinholes, creases, stained spots and other defects. The values of thickness thereof measured in the same manner as in Example 1 were 1.1 μm at the center and 1.1 μm, 1.0 μm, 1.1 μm and 1.1 μm at the other four points.

The transmission of light through the resin membrane was 98.0% at the wavelength of 365 nm. These results support the conclusion that this resin membrane is excellent as a pellicle for photolithographic mask.

COMPARATIVE EXAMPLE

The resin solution used in Example 1 was applied to the surface of a synthetic fused silica glass disc having a thickness of 2 mm and a diameter of 220 mm by using a spinner and dried to give a resin film formed on the substrate followed by peeling of the resin film from the substrate in water with the same frame as in Example 1 adhesively bonded beforehand to the resin film.

The resin membrane thus obtained was subjected to the measurement of the thickness in the same manner as in Example 1 to give values of 1.1 μm at the center and 1.7 μm, 1.5 μm, 1.6 μm and 1.8 μm at the other four points. The transmission of light through this resin membrane was 96%. The membrane was free from pinholes but occurrence of creases was found.

What is claimed is:

1. A method for the preparation of a membrane of a fluorocarbon resin as a pellicle for a photolithographic mask which comprises the successive steps of:
   (a) coating the surface of a substrate with a solution of a fluorocarbon resin having film-formability in a solvent by using a roller coater to form a layer of the resin solution;
   (b) evaporating the solvent from the coating layer of the resin solution to form a dry film of the resin on the substrate surface; and
   (c) peeling the resin film from the substrate surface.

2. The method as claimed in claim 1 in which the fluorocarbon resin is a copolymer of tetrafluoethylene and a fluorine-containing ethylenically unsaturated monomer having a cyclic perfluoro ether group in a molecule.

3. The method as claimed in claim 1 in which the solution of the fluorocarbon resin has a concentration in the range from 5% to 10% by weight.

4. The method as claimed in claim 1 in which the solvent has a boiling point in the range from 50° C. to 150° C.

5. The method as claimed in claim 4 in which the solvent is a fluorine-containing organic compound.

6. The method as claimed in claim 1 in which the dry film of the fluorocarbon resin on the surface of the plastic film has a thickness in the range from 0.5 μm to 8 μm.

7. The method as claimed in claim 1 in which the roller coater is an offset gravure coater.

8. The method as claimed in claim 1 in which the surface of a plastic film as a substrate is treated with a silicone-based surface release agent prior to coating with the solution of the fluorocarbon resin.

* * * * *